June 26, 1934.  C. M. KING  1,964,470
PULLING TOOL
Filed Sept. 21, 1932
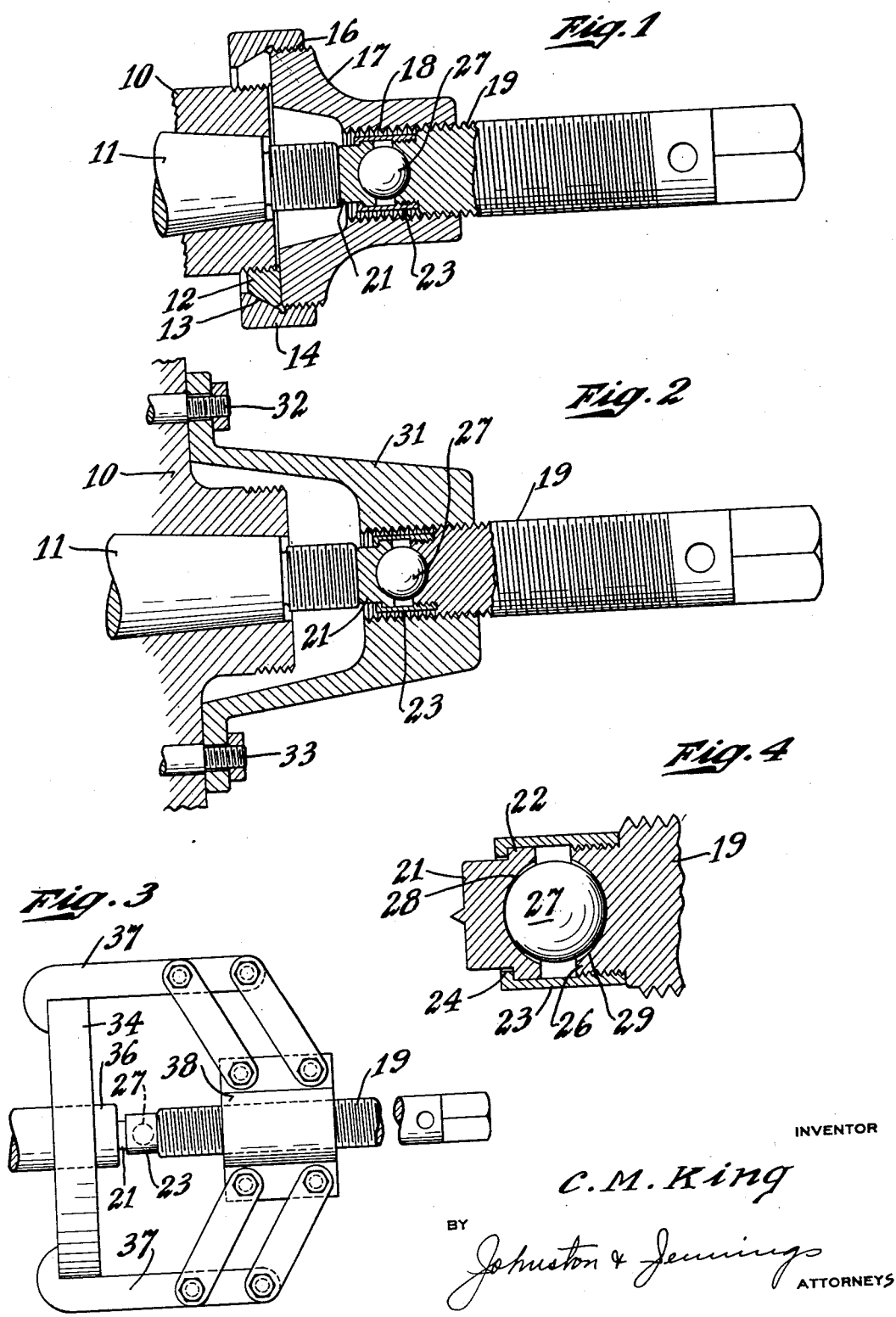
INVENTOR
C. M. King
BY Johnston & Jennings
ATTORNEYS Patented June 26, 1934

1,964,470

UNITED STATES PATENT OFFICE 1,964,470

PULLING TOOL

Charles M. King, Birmingham, Ala.

Application September 21, 1932, Serial No. 634,119

1 Claim. (Cl. 29—85)

My invention relates to pulling tools, such, for example, as wheel pullers, gear pullers, and the like, and has for its object the provision of a device of the character designated which shall be simple of construction and dependable in operation, and which shall include a compression element in the form of a jack screw which shall be operable with a minimum of friction, and which shall embody a bearing element housed entirely within the lateral boundaries of the screw.

A further object of my invention is the provision of a jack screw for pulling tools which shall include a ball bearing element housed entirely within the projected lateral boundaries of the screw threads, whereby the screw may be employed interchangeably with a variety of tools.

Briefly, my invention consists of a pulling tool comprising wheel and shaft engaging members, the latter being in the form of a screw having a ball bearing work engaging head with a housing therefor, the head and housing being smaller in diameter than the screw. The bearing being positioned directly behind the work engaging head, minimizes lateral strain on the screw and reduces to a minimum friction in operating the screw, thus permitting a much greater force exertion by the screw.

A particular feature of my invention is the provision of a ball bearing head on the work engaging screw which, with its housing, is smaller in diameter than the screw. This permits a single screw to be interchangeably used with a plurality of pulling units, such as with a gear puller and wheel pullers of different types. It also permits a wide adjustment of the screw to accommodate the position of the shaft or axle to be engaged thereby, without the necessity of interposing plungers or other accessories between the screw and the work to be engaged.

A device embodying features of my invention is illustrated in the accompanying drawing forming a part of this application, in which Fig. 1 is a sectional view of one type of wheel puller made in accordance with my invention;

Fig. 2 is a view similar to Fig. 1 showing a different type of wheel puller;

Fig. 3 is a view showing my invention applied to a gear puller; and

Fig. 4 is a detail sectional view showing the work engaging head of the screw employed with my invention.

Referring to the drawing, I show in Fig. 1 the hub 10 of a wheel to be removed from the axle 11. Screwed on to the hub 10 is a contractable ring 12 having an outer bevelled surface 13 over which fits a collar 14 having an inner bevelled surface complementary to the surface of the ring 12. The collar 14 is interiorly threaded at 16 to receive the threaded end of a sleeve 17 which, upon being screwed into the collar 14, causes the ring 12 to contract and tightly engage the hub 10.

The sleeve 17 is interiorly threaded at 18 to accommodate a threaded work engaging screw 19 which is screwed through the sleeve to engage the end of the shaft 10 to remove the wheel.

The work engaging end of the screw 19 comprises a head 21 having an annular flange 22 over which fits a retaining cap 23. The retaining cap 23 is provided with an opening 24 through which the head 21 protrudes. The outer end of the body of the screw 19 is turned down and threaded to form a reduced portion 26, and the retaining cap 23 is screwed on to the reduced portion 26. The end 26 is sufficiently reduced in diameter so that the retaining cap 23 is smaller in diameter than the body of the screw 19.

Interposed between the work engaging head 21 and the reduced portion 26 of the screw is a spherical bearing 27. The head 21 is provided with a spherical recess 28 and the reduced portion 26 of the screw is provided with a spherical recess 29 to accommodate the bearing 27, the recesses 28 and 29 having a longer radius than the radius of the bearing 27, whereby to minimize friction between the head and the body of the screw.

The device shown in Fig. 2 may employ the same screw 19 as is employed with the device in Fig. 1. The wheel puller shown in Fig. 2 comprises an interiorly threaded sleeve 31 adapted to receive the screw 19 which, as in Fig. 1, is adapted to engage the end of the shaft 11 to remove the wheel 10. The sleeve 31 is secured to the wheel 10 by means of hub bolts 32 and 33.

In Fig. 3, I show a gear 34 mounted on a shaft 36. The gear is engaged for removal by hooked arms 27 flexibly connected to a yoke member 38 which is interiorly threaded to accommodate the work engaging screw 19, which latter is adapted to engage the end of the shaft 36 and exert a pulling effort on the gear 34.

From the foregoing, it will be apparent that I have provided a work engaging screw for pulling devices which may be interchangeably employed with a variety of such devices, and which may be operated with a minimum of friction between the screw and the work to be engaged. According to my invention, a variety of such pulling devices, such as are usually found around a shop, may be operated with a single screw, thus greatly reducing the tool expense and at the same time providing a more efficient operation than in such tools as heretofore known to me.

While I have shown my invention in several forms, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claim.

What I claim is:

In a pulling tool having a work engaging screw, a separable head having a flat work engaging surface for the work engaging end of the screw and mounted for rotation relative thereto, a ball bearing interposed between the head and the body of the screw, seats formed in the end of the screw and the head adapted to receive said ball bearing, said seats having a larger radius than the ball bearing, a shoulder formed on the head, a retainer cap adapted to be secured at its inner end to the end of said screw, and an inwardly turned flange formed on said retainer cap adapted to engage the outer surface of the shoulder formed on the head, said cap and head being smaller in diameter than the body of the screw.

CHARLES M. KING.